United States Patent

[11] 3,591,142

| [72] | Inventor | Frank Lynn Hatcher |
| | | 147 Rhame Terrace, Santa Paula, Calif. 93060 |
| [21] | Appl. No. | 743,557 |
| [22] | Filed | July 9, 1968 |
| [45] | Patented | July 6, 1971 |

[54] TOOLS FOR SPLIT PIPE COLLARS
1 Claim, 7 Drawing Figs.

[52] U.S. Cl. .................................................. 254/79
[51] Int. Cl. .................................................. B66f 3/00
[50] Field of Search .................................................. 269/287, 228; 29/229, 238, 237, 269, 267; 81/3, 9.3, 15.8, 378; 24/68, 270, 271; 254/77—79, 131, 133

[56] References Cited
UNITED STATES PATENTS

| 2,566,454 | 9/1951 | Laschke | 81/9.3 X |
| 2,683,051 | 7/1954 | Christophersen | 24/68.3 X |
| 2,787,442 | 4/1957 | Lewis | 254/79 |
| 3,341,178 | 9/1967 | Cott | 254/79 |

*Primary Examiner*—Robert C. Riordon
*Assistant Examiner*—David R. Melton
*Attorney*—Pastoriza & Kelly ABSTRACT: Tools are provided for changing the effective circumference of a split pipe defining a collar for connecting the ends of pipe sections. Each tool includes a lever arm terminating at one end in a handle and at its other end in a first hook means arranged to engage a flange secured adjacent to one edge of the split portion of the pipe collar. A shaft structure in turn is pivoted at one end at a pivot point intermediate the ends of the lever arm and terminates at its other end in a second hook means arranged to engage a flange secured to the other longitudinal edge defining the split in the pipe collar. The arrangement is such that swinging of the lever arm about the pivot point serves to vary the spacing between the first and second hook means and thus vary the effective circumference defined by the split pipe collar. The collar can thus be tightened about the ends of pipe sections to be secured together or loosened with respect to these sections to facilitate removal of the pipe sections. The pivot point and hook means are so designed that an overcentering action can take place so that the tool will effectively lock itself to its swung position.

PATENTED JUL 6 1971 3,591,142

*INVENTOR:*
FRANK LYNN HATCHER
*BY*
*Elliott & Pastoriza*
*ATTORNEYS*

TOOLS FOR SPLIT PIPE COLLARS

This invention relates generally to tools and more particularly to novel lever type tools for use in the installation of corrugated-type metal piping or conduit.

BACKGROUND OF THE INVENTION

Many present day piping or conduit systems for carrying water or other fluids or even wasted material are formed from corrugated sheet metal sections which may be rolled and longitudinally welded to define pipe sections. These sections may be from 12 to 30 feet long and from 4 to 6 feet in diameter. The various pipe sections are connected together to form a drain line or conduit system of desired length. Normally the sections are buried in a suitable sized trench cut into the ground although they may be simply positioned end to end on the surface of the ground.

The actual coupling of the ends of the pipe together is generally accomplished by a shorter pipe section formed of the corrugated sheet metal which is longitudinally split to define a split pipe collar. This collar is provided with first and second flanges extending radially outwardly and fixed respectively adjacent to the longitudinal edges defining the split. The flanges themselves include center and outer holes for receiving bolts and nuts so that the collar split portion may be clamped together.

With the foregoing arrangement, the flanges and thus the split may be separated slightly to circumferentially expand the open ends of the collar. These ends can then receive the ends of pipe sections to be connected together. After the ends of the pipe section are received in the collar, the flanges are brought together to circumferentially contract the collar about the end portions of the pipe section. Bolting of the flanges together will thus secure the desired connection.

The foregoing type of assembly is advantageous in that the corrugated sheet metal type of piping can be provided relatively inexpensively even for custom installations requiring various odd sizes of pipe diameter. Further, the simple connecting arrangement employing the split collar of the same material renders installation of a system, particularly those to be used only temporarily, fairly simple. Disassembly of the piping system is also accomplished fairly simply in view of the particular type of split collar couplings employed.

In spite of the foregoing simple features of the corrugated sheet metal-type piping systems, there are still required at least two and preferably three men to effect connection between pipe sections by means of the split collar. Thus, one or two of the men must hold the flange portions of the split collar apart so that the open ends of the collar are circumferentially expanded sufficiently to receive the ends of the pipe section. These ends of the pipe sections are then inserted by other men present while the flanges are held in a spaced-apart condition. Thereafter, one or two of the men must exert a force on the flanges moving them towards each other to circumferentially contract the ends of the split collar about the received ends of the pipe sections. The flanges must be held in this fairly close relationship while another party inserts bolts and nuts through the various holes in the flanges.

Disassembly of a piping system of the above type particularly after prolonged use of the system can be equally time consuming and again requires usually more than two persons. Thus, it is necessary to remove the bolts from the split pipe collar flanges and thereafter urge the flanges apart. Because of prolonged use in closed position, the collar is normally set in this position so that a reverse biasing force is required to circumferentially expand the open ends of the collar. One person must apply this force while other persons remove the pipe sections from the open ends of the collar.

In both the installation and disassembly of the pipe systems as described above, the labor conditions are often aggravated as a consequence of the use of a tar or asphalt like substance on the interior of the various pipe sections and collars. This substance is employed to provide a smooth interior wall surface for the pipe sections and thus lessen the undesirable affects resulting from the corrugations of the metal. These corrugations, if left in their natural state would impede considerably fluid flow through the piping system and it is therefore the practice to line the interior with a suitable semiviscous material to define smooth surfaces. This material is generally messy and gets on the exterior of the pipe sections and split pipe collar portions. As a result, the flanges are slippery and it is very difficult for workers to assemble the sections under these conditions.

BRIEF DESCRIPTION OF THE PRESENT INVENTION

The present invention contemplates the provision of novel tools for aiding a worker in installing or assembling and in disassembling pipe sections wherein the various disadvantages described heretofore as substantially overcome.

More particularly, the invention contemplates a tool in the form of a lever arm terminating at one end in a handle means and at its other end in a first hook means adapted to be hooked into at least one of the holes in one of the flanges of the split pipe collar. A shaft means is pivoted at one end to a point on the lever arm defining a pivot point intermediate the handle and the first hook means. This shaft terminates at its other end in a second hook means adapted to be hooked into one of the holes in the other of the flanges in the split pipe collar. The geometry is such that the shaft forms an angle with the portion of the lever arm between the first hook means and the pivot point. This angle decreases when the flanges are brought together to decrease the effective circumference of the split collar and increases when the flanges are spaced apart to increase the circumference. Swinging of the handle portion of the lever arm changes this angle in a desired manner to either circumferentially contract or circumferentially expand the split collar and the positioning of the pivot point is such that an overcenter action results so that the lever arm will remain in its swung position and hold the flanges either in closely spaced relationship or spread apart relationship as desired.

In a first embodiment of the invention, the tool is designed to draw the flanges together during an installation of a piping system so that the ends of the split collar will circumferentially tightly engage inserted ends of pipe sections to be connected together. The overcentering action maintains the flanges in their close relationship so that a single worker can then install bolts and nuts through the remaining holes in the flanges.

A second embodiment of the invention contemplates a tool useful in disassembling the pipe sections wherein the flanges are urged apart and held in spaced apart relationship while a worker removes the ends of pipe sections from the split collar.

BRIEF DESCRIPTION OF THE DRAWINGS

A better understanding of the invention will be had by now referring to preferred embodiments thereof as described in conjunction with the attached drawings, in which.

DETAILED DESCRIPTION OF THE PREFERRED EMBODIMENTS

Figure 1:
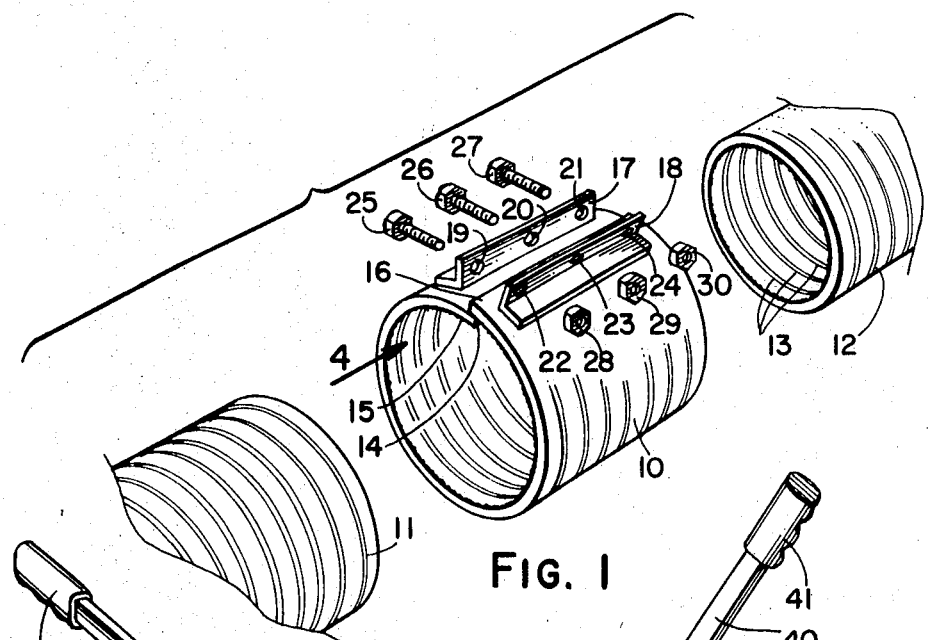
FIG. 1 is a perspective view of a split pipe collar in position preparatory to connecting together two pipe sections shown in fragmentary form.

Referring first to FIG. 1 there is shown a split pipe collar 10 formed of corrugated sheet metal for connecting together first and second pipe sections 11 and 12. As indicated, these pipe sections are also formed from corrugated sheet metal, the corrugations being indicated by the annular ribs 13 by way of example on the interior of the pipe section 12.

As described heretofore, the pipe sections 11 and 12 are seam welded to form tubular pipes. On the other hand, the collar 10 is split at 14, the longitudinal edges 15 and 16 defining this split being in overlapped relationship as shown. Secured adjacent to these longitudinal edges are first and second flanges 17 and 18 extending generally radially outwardly as shown. Each of the flanges includes transverse holes such as indicated at 19, 20, and 21 for the flange 17 and 22, 23, and 24 for the flange 18. Preferably, there is only necessary center holes such as 20 and 23 and pairs of outside holes which is indicated at 19, 21, and 22, 24. The holes are in general axial alignment when the flanges 17 and 18 are brought close to each other. Suitable bolts such as indicated at 25, 26 and 27 for cooperation with nuts 28, 29 and 30 all shown in exploded positions are provided to secure the flanges 17 and 18 together.

To connect the pipe sections 11 and 12 together, the flanges 17 and 18 of the collar 10 are spread apart to circumferentially expand the open ends of the collar. The pipe sections 11 and 12 are then telescopically received in these open ends. Thereafter, the flanges 17 and 18 are brought together to increase the degree of overlap of the edges 15 and 16 and thereby thoroughly clamp the ends of the pipe sections in axial alignment. As described heretofore, this process usually requires at least two workers and preferably three to effect such an assembly.

Figure 2:
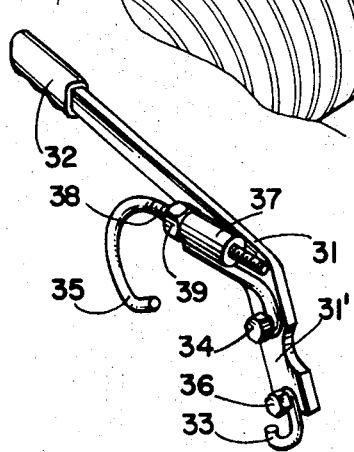
FIG. 2 is a perspective view of a first embodiment of a tool in accord with the present invention useful for assembling the collar and pipe sections of FIG. 1.

Referring now to FIG. 2 there is shown a first embodiment of the present invention in the form of a tool for facilitating the operation of assembling the pipe section of FIG. 1. As shown, the tool of FIG. 2 includes a lever arm 31 terminating at one end in a handle 32 and at its other end in a first hook means 33. Intermediate the ends of the lever arm 31 there is defined a pivot point 34 pivoting one end of a shaft means terminating at its other end in a second hook means 35.

In the embodiment of FIG. 2, the first hook means takes the form of a hook element pivoted at 36 to the lever arm 31 as shown. The shaft means for the second hook means 35 in turn preferably comprises a threaded tube 37 cooperating with a threaded stud 38 received in the tube 37 and integrally formed with the second hook means 35. A lock nut 39 is provided on the threaded stud 38 adjacent one end of the threaded tube 37. The arrangement is such that the distance between the second hook means 35 and the pivot point 34 may be varied by threading the stud portion 38 into and out of the threaded tube 37. The first and second hook means 33 and 35 of FIG. 2 take the form of single hook elements in opposing relationship to each other.

Figure 3:
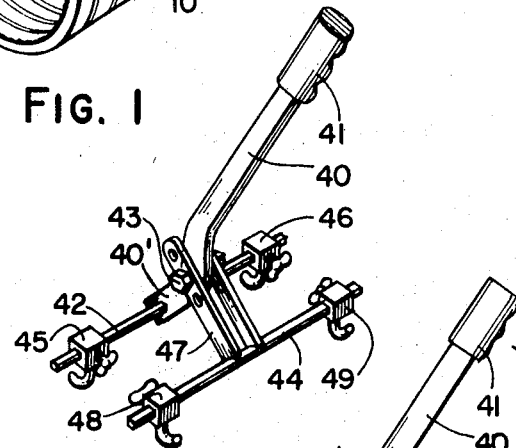
FIG. 3 is a perspective view of a tool in accord with a second embodiment of the invention useful in disassembling the pipe sections of FIG. 1 after the same have been connected.

Referring now to FIG. 3 there is shown a second embodiment of the invention in the form of a tool useful for facilitating disassembly of the pipe sections 11 and 12 of FIG. 1. As shown, this tool comprises a lever arm 40 terminating at one end in a handle 41 and at its other end in a first hook means 42. A pivot point 43 is defined intermediate the ends of the lever arm 40 and serves to pivot one end of a shaft means terminating at its other end in a second hook means 44. The basic elements defined in FIG. 3 are thus essentially equivalent to the elements defined in FIG. 2. However, in FIG. 3 details of the geometry are different from FIG. 2.

More particularly, it will be noted that the first hook means 42 in the embodiment of FIG. 3 takes the form of a first pair of hook elements 45 and 46 spaced such as to be received in the outer holes of the flanges of the split collar 10 of FIG. 1. Towards this end, the hook elements are in the form of blocks slidably spaced to the proper position and then tightened as by wing setscrews. The shaft means in turn takes the form of a pair of bars such as indicated at 47 straddling the pivot point 43 and supporting the second hook means 44. This latter hook means, as in the case of the first hook means, comprises hook elements in the form of slidable blocks 48 and 49 spaced to be received in the outer holes of one of the flanges of the split collar 10 of FIG. 1. The various hook element pairs making up the first and second hook means of FIG. 3 face outwardly or away from each other.

OPERATION OF THE FIRST EMBODIMENT

Figure 4:
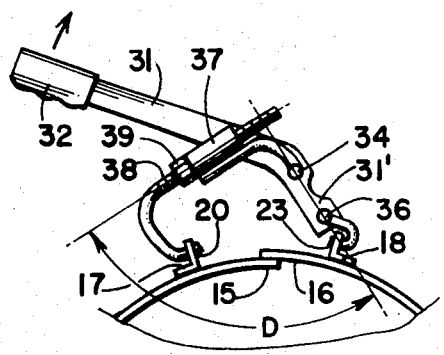
FIGS. 4 and 5 are elevational views looking in the direction of the axis of the split collar of FIG. 1 illustrating the tool of FIG. 2 in unlocked and locked positions respectively; and, FIGS. 6 and 7 are elevational views looking in the direction of the axis of the split pipe collar of the tool of FIG. 3 in unlocked and locked positions respectively.
Figure 5:
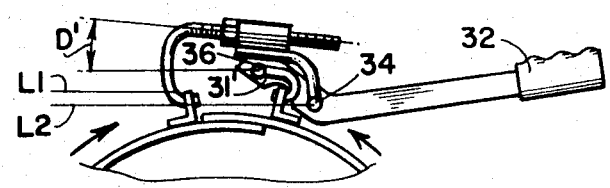

Referring to FIGS. 4 and 5, the operation of the first tool embodiment as shown in FIG. 2 will be evident. As mentioned, this tool is employed in securing the collar 10 about the ends of the pipe sections 11 and 12 of FIG. 1.

Initially, the pipe ends 11 and 12 are telescopically positioned in the open ends of the split collar 10 of FIG. 1 while the same is in a generally circumferentially expanded condition. This operation may be carried out by a single worker. The worker will then insert the first and second hook means 33 and 35 of FIG. 2 in the center holes 23 and 20 of the flanges 18 and 17 as shown in FIG. 4. The handle 32 is then swung in a clockwise direction about the pivot point 34 thereby decreasing the angle D defined by the shaft means in the form of the threaded tube 37 and stud 38 and the portion of the lever arm 31' between the pivot point 34 and first hook means 33.

Swinging of the handle in the foregoing manner, will draw the flanges 17 and 18 together to the final position illustrated in FIG. 5. In this finally swung position, it will be noted that the pivot point 34 is over centered with respect to the direction of the forces opposing the hook elements. That is, the tendency of the flanges to separate because of the bias of the sheet metal is directed along a force line L1 which force line is above the level indicated by the line L2 of the pivot 34. As a consequence of this overcentering action, the lever arm will remain in its swung position to tightly clamp the flanges in close relationship.

The worker may now insert the bolts 25 and 27 through the outer holes in the flanges and secure the nuts 28 and 30 all as shown in FIG. 1. After these bolts and nuts have been secured, the tool may be readily removed by swinging the arm in a reverse direction back to the position illustrated in FIG. 4 thereby removing the hook elements from the center holes. The final bolt 26 and cooperating nut 29 may then be secured in the center holes.

From the foregoing, it will be evident that a single worker may assemble the ends of the two pipe sections 11 and 12 together in a very expeditious manner and without having to handle to any appreciable extent the flange and other portions of the pipe coupling.

OPERATION OF THE SECOND EMBODIMENT

Figure 6:
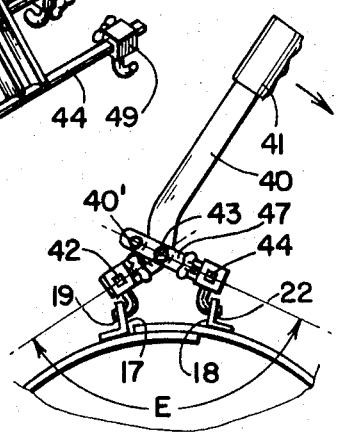
Figure 7:
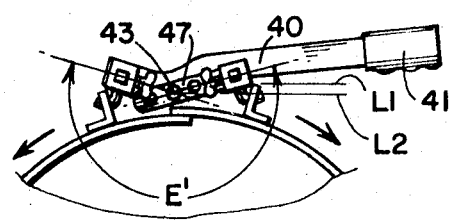

Referring now to FIGS. 6 and 7, the manner in which the second embodiment of the invention as described in FIG. 3 is utilized to facilitate disassembly of the pipe sections will become evident.

Assuming that the conduit or piping system has been installed for a considerable length of time, the split collar will tend to remain in its clamped position. Thus, even after a worker has removed the three bolts from the various holes, the flanges will tend to remain together and it is normally necessary to pry the same apart in order to facilitate removal of the pipe section ends from the collar. In this operation, the first hook means in the form of the pair of hook element block 45 and 46 are horizontally adjusted as described in FIG. 3 for insertion in the outer holes 19 and 21 of the flange 17 as illustrated in FIG. 6. The second hook means in the form of the pair of blocks 48 and 49 are similarly adjusted and inserted through the outer holes in the flange 18.

In the position illustrated in FIG. 6, there is again defined an angle E between the shaft means 47 and portion of the lever arm 40 indicated at 40' between the first hook means 42 and pivot point 43. When the handle 41 of the lever arm 40 is now swung in a clockwise direction about the pivot point 43, this angle E is increased thereby spreading apart the first and second hook means 42 and 44 to the final position illustrated in FIG. 7. Again, an overcentering action takes place in that the sheet metal biasing force tending to urge the flanges together in opposition to the hook elements lies on a line L1 above the level of the pivot point 43 indicated by the line L2. The tool with thus remain locked in its swung position illustrated in FIG. 7 to hold the flanges in their spaced-apart relationship as shown.

The worker may then remove the pipe section ends 11 and 12 from the open ends of the circumferentially expanded collar.

It will be evident that in both embodiments of the invention, the angle D for the tool shown in FIG. 4 and the angle E for the tool shown in FIG. 6 are relatively small when the flanges are in close relationship and relatively large when the flanges are in spaced-apart relationship. For the tool of FIG. 4 the decreased angle is shown at D' in FIG. 5 and for the tool of FIG. 6, the increased angle is shown at E' in FIG. 7.

The provision of pairs of hook elements for the first and second hook means in the embodiments of FIGS. 3, 6, and 7 is important in that any misalignment or torsional twisting of the pipe section during separation of the flanges is avoided.

From the foregoing description, it will be evident that the present invention has provided unique and novel tools which greatly facilitate the assembly and disassembly of corrugated-type pipe sections all to the end that the various problems heretofore encountered have been overcome and the assembly and disassembly of piping systems can be accomplished far more economically than heretofore possible.

What I claim is:

1. A tool for use in a split pipe collar having exterior first and second flanges extending radially outwardly and fixed respectively adjacent to the longitudinal edges defining said split, and wherein said flanges include center and outer holes for receiving bolts to hold said flanges in closely spaced relation to enable locking of said split pipe collar about the ends of pipe sections telescopically received in opposite openings of said split pipe collar, said tool cooperating with said flanges to facilitate expanding the effective circumference of said collar for inserting and removing said ends of said pipe sections, said tool comprising:
   a. a lever arm terminating at one end in a handle means and at its other end in a first hook means comprising a pair of hook elements spaced apart to be simultaneously received through the inner sides of the outer holes in one of said flanges; and,
   b. a shaft means pivoted at one end to a point on said lever arm defining a pivot point intermediate said handle and said first hook means and terminating at its other end in a second hook means comprising a pair of hook elements spaced apart to be simultaneously received through the inner sides of the outer holes in the other of said flanges so that said second hook means face away from said first hook means when said flanges are together, said shaft forming an angle with the portion of said lever arm between said first hook means and said pivot point, swinging of said lever arm to increase said angle urging said flanges apart, the extent of swinging of said lever arm being such as to over center said pivot point relative to the forces exerted on said first and second hook means by said flanges so that said lever will remain in its swung position to leave a user'hands free to remove or insert said pipe sections.